Oct. 31, 1961 L. H. PHILLIPS Re. 25,073

COMPARTMENTED CARTON

Original Filed Dec. 2, 1957 3 Sheets-Sheet 1

Inventor:
Lawrence H. Phillips
By: Robert D. Teichert
Atty.

COMPARTMENTED CARTON

Original Filed Dec. 2, 1957 3 Sheets-Sheet 2

Inventor
Lawrence H. Phillips
By: Albert D. Seichert
Atty.

COMPARTMENTED CARTON
Original Filed Dec. 2, 1957 3 Sheets-Sheet 3
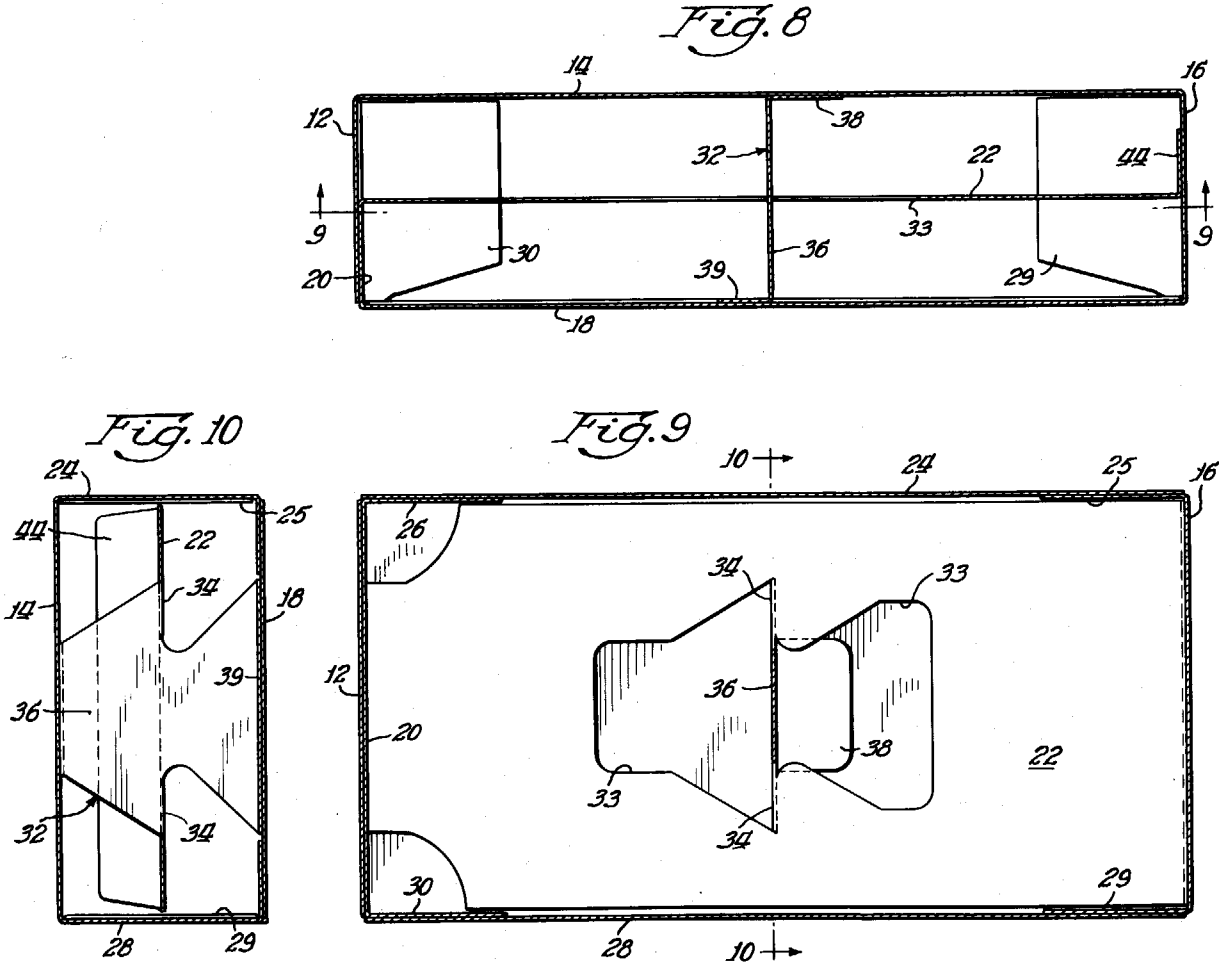
Inventor:
Lawrence H. Phillips
By: Albert D. Seichert Atty.

United States Patent Office

Re. 25,073
Reissued Oct. 31, 1961

25,073
COMPARTMENTED CARTON

Lawrence H. Phillips, Chattanooga, Tenn., assignor to Container Corporation of America, Chicago, Ill., a corporation of Delaware Original No. 2,965,278, dated Dec. 20, 1960, Ser. No. 699,999, Dec. 2, 1957. Application for reissue July 7, 1961, Ser. No. 126,770
3 Claims. (Cl. 229—28)

Matter enclosed in heavy brackets [ ] appears in the original patent but forms no part of this reissue specification; matter printed in italics indicates the additions made by reissue.

This invention relates generally to cartons, and has particular reference to a carton formed to provide multiple compartments, and also to the blank from which the carton is formed.

The main object of this invention is the provision of a compartmented carton formed from a single blank of sheet material.

Another object of the invention is to provide a single integral blank of foldable material, such as paperboard or the like, formable into a carton, collapsible to a flat state, and which upon erection from said collapsed condition affords automatic disposition of partition forming elements whereby to provide a carton having multiple compartments.

A further object of the invention is the provision of a compartmented carton affording multiple integral partition elements, wherein said partition elements are formed from and by a single, common member.

Still another object of the invention is to so construct a single blank of sheet material that six panels serially connected can be manipulated to form a four compartment carton.

An important phase of the present invention resides in the manner in which the above described objectives are obtained from a single integral blank of sheet material, such as paperboard or the like. According to the general features of the invention the blank is cut and scored to provide six panels serially connected, one of said panels having a central portion thereof displaceable in a manner to dispose parts of said portion on either side of said panel. Displacing the central portion to a particular position, and while in such position folding and gluing the blank in a particular manner, thereby securing parts of said central portion to alternate and opposed panels, provides an assembled compartmented carton in collapsed condition. Inward pressure applied longitudinally at the ends of the collapsed carton results in movement of the panels to open or set up condition, forming a rectangular carton having partition elements disposed therein suitable to afford multiple compartments within said carton. The partition elements comprise the described central portion and the panel from which said central portion was displaced, each disposed in a plane normal to the other. This carton construction provides packaging means suited to receiving and retaining several articles separated one from the other and removable from the carton independently of the remaining articles. Also, and as previously mentioned, this construction is such that the assembled carton may be flattened, and in such condition is suitable for shipping and stacking prior to set-up and use.

Further objects, features, and advantages of this invention will appear, or be apparent to one skilled in the art, from the following description, reference being made to the accompanying drawings, in which:

FIGURE 8 is a horizontal sectional view taken on line 8—8 of FIGURE 7, showing the wall and partition arrangement of the set-up carton.

FIGURE 9 is a longitudinal sectional view taken on line 9—9 of FIGURE 8.

FIGURE 10 is a vertical sectional view taken on line 10—10 of FIGURE 9.

Figure 1:
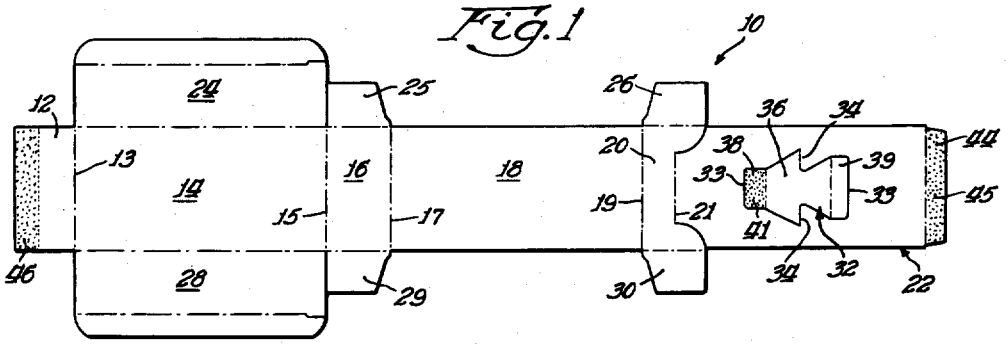
FIGURE 1 is a plan view of the one-piece blank used in making a carton according to the teachings of this invention.

Referring now to the drawings, and particularly FIGURE 1, the reference numeral 10 indicates in general a blank of foldable sheet material, such as paperboard or the like. The blank comprises an aligned series of panel sections designated by numerals 12, 14, 16, 18, 20, and 22, hingedly connected one to another, respectively, by score lines 13, 15, 17, 19, and 21. The top margins or edges of panels 14, 16, and 20 are provided with closure flaps 24, 25, and 26, respectively, score lines separating the panels from the closure flaps. In like manner the lower margins of panels 14, 16, and 20 have flexibly connected thereto by score lines closure flaps 28, 29, and 30, respectively. As shown, end panel 22 is formed to provide a displaceable central portion 32, defined by cuts 33 and scores 34, said central portion comprising a main member 36 having flaps 38 and 39 flexibly connected at the ends thereof.

Figure 3:
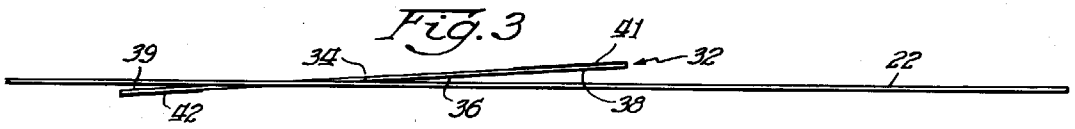
FIGURE 3 is a top-edge elevational view of the panel shown in FIGURE 2.
Figure 2:
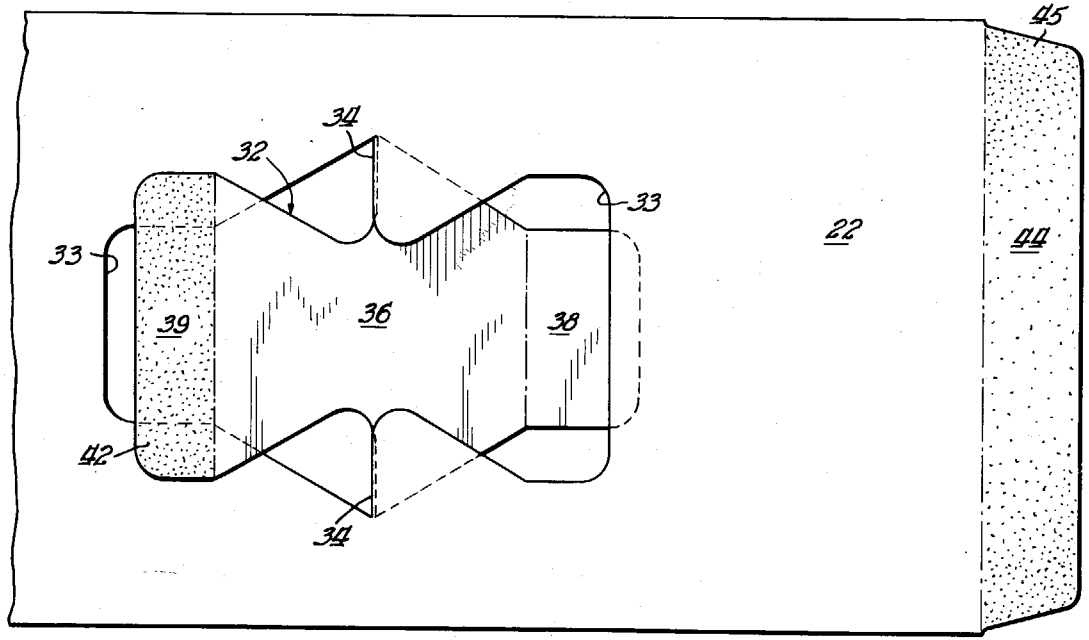
FIGURE 2 is a fragmentary plan view on an enlarged scale of a certain panel of the blank of FIGURE 1, showing a central portion of said panel displaced therefrom.

It is perhaps obvious that aligned scores 34 being the only means connecting central portion 32 to the panel 22, afford an axis or pivotal point about which the central portion can be swung in displacement from said panel. As seen in FIGURES 2 and 3, displacement of the central portion 32 in a particular and preferred manner pivots said portion about the scores 34, disposing flaps 38 and 39 on opposite sides of panel 22, and in reversed positions relative to the panel. The particular configuration and arrangement of the displaceable central portion is such that pivotal movement thereof is limited to slightly less than 180 degrees, whereupon flaps 38 and 39 abut the panel portions outlying and adjacent the central portion. The flaps 38 and 39 each have one surface thereof, 41 and 42 respectively, treated with an adhesive coating, and as indicated said adhesive coated surfaces face outwardly relative to the panel 22 when the central portion 32 has been displaced to the pre-assembly position illustrated in FIGURES 2 and 3. It is also noted that panel 22 is provided with a glue flap 44 coated with an adhesive designated by reference numeral 45, and panel 12 has an adhesive coated area as indicated by the numeral 46, all for a purpose now to be described.

Figure 4:
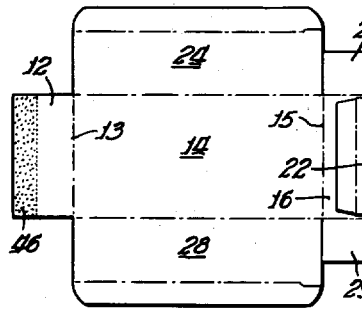
FIGURE 4 is a plan view of the one-piece blank partially assembled.
Figure 5:
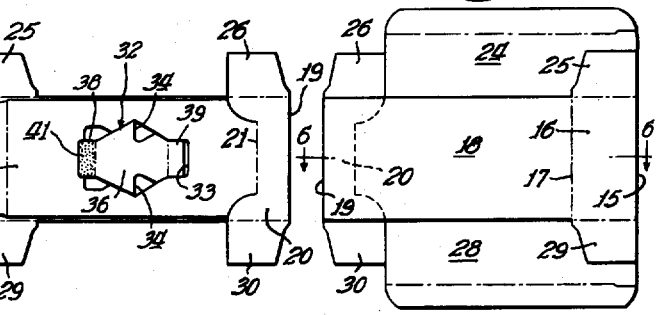
FIGURE 5 is a plan view of an assembled carton in a collapsed condition.

With central portion 32 displaced to the reverse position relative to panel 22 above described, and retaining said portion in said position, panels 20 and 22 are folded as a unit about score line 19 to a position of contact with other portions of the blank, as shown in FIGURE 4. In such contacting position glue flap 44 and flap 39 of the displaced central portion are disposed adjacent panel 16 and panel 18, respectively, and by means of their respective adhesive coatings, secured thereto providing a partially assembled carton. Folding this partially assembled portion of the blank upwardly and about score line 15 to a position of contact with the remaining portions of the blank as seen in FIGURE 5, disposes panel 12 adjacent panel 20, and flap 38 of the displaced central portion adjacent panel 14, and by means of their respective adhesive coatings, secures said panels and said flap and panel one to the other, thereby providing an assembled carton. As shown, the assembled carton resulting from the sequential displacing, folding and gluing is formed in a collapsed or flat state, and as such is suited for stacking and shipping prior to carton set-up and use.

Figure 7:
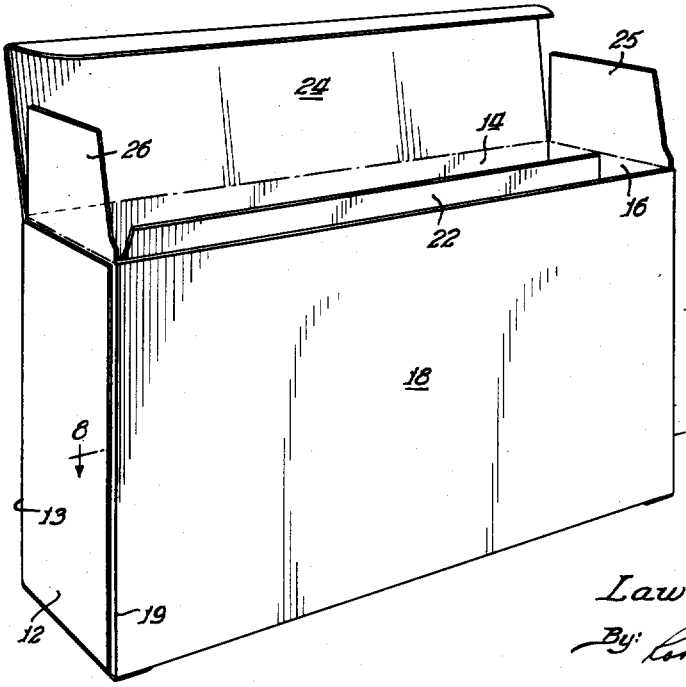
FIGURE 7 is an enlarged perspective view of an assembled and set-up carton with top closure flaps open.
Figure 6:
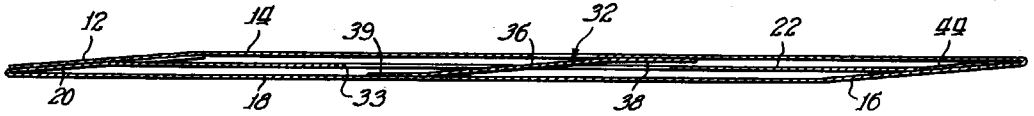
FIGURE 6 is a horizontal sectional view of the assembled and collapsed carton, taken on line 6—6 of FIGURE 5.

Carton set-up from a collapsed condition is accomplished in a well-known manner, by applying inward pressure longitudinally at the carton ends which, as seen in FIGURE 5, are coincidental with score lines 15 and 19. The set-up carton, shown in FIGURE 6, is rectangular in shape and offers opposed side walls or panels 14 and 18, and opposed end walls, one end wall comprising panel 16 and the other end wall comprising panels 12 and 20, partially overlapped. In a manner to be described, panel 22 is disposed intermediate the side walls and substantially parallel therewith, presenting a longitudinal partition wall, while main member 36 of the central portion 32 is disposed intermediate the end walls and substantially parallel therewith, presenting a transverse partition member. This disposition of side walls, end wall, and partition wall and member, best shown in FIGURE 7, provides a carton having a plurality of compartments. Such a compartmented carton is adapted for receiving a plurality of articles, retaining same separated one from the others, and permitting removal of each independently of the others.

It should be apparent that because of the original displacement of central portion or partition member 32 from panel or partition wall 22, and the subsequent manner of securing particular portions thereof to the blank, as well as portions of the blank to other portions of the blank, that movement of the panel sections comprising the side and end walls from the collapsed condition illustrated in FIGURE 6 to the set-up condition shown in FIGURE 8, will result in relative movement between panel 22 and the main member 36 of central portion 32. Thus, panel 22 being substantially coextensive with the side walls and hingedly connected centrally of the end walls will occupy a position intermediate to and parallel with the side walls, whereas main member 36 being substantially coextensive with the end walls and hingedly connected centrally of the side walls will occupy a position intermediate to and parallel with the end walls. Aligned score lines 34 provide an axis or pivot elements about which relative movement of the various elements described occur, although it is obvious that once the carton is assembled a connection between panel 22 and main member 36 is not essential since the desired relative movement and subsequent disposition is determined by the interrelation and securement of the carton parts. However, maintaining the connection between panel 22 and main member 36 is preferred in that it provides carton rigidity and strengthens the partition arrangement.

Concerning the relative disposition of the partition wall 22 to the side walls 14 and 18, it is noted that panel 20 can be considered an extension of the wall 18, providing not only a portion to underlie end wall 12 for assembly purposes in gluing, but also determining by its width the position of partition wall 22. It is obvious that varying the width of the extension will change the position of the partition relative to the side walls.

It is apparent that the assembled carton described is held in set-up condition by means of the described top and bottom closure flaps. These closure flaps may be modified in any manner desired so long as they provide adequate locking means, the locking action itself being well known in the art.

From the foregoing description it is seen that the one-piece blank of FIGURE 1 is cut and scored in a novel manner whereby panels serially connected can be manipulated and formed to provide a compartmented carton. Of particular importance is the formation of several partition elements from and by a single, common member, such construction affording economy through reduction of material normally required for this type carton. Also, a carton formed in accordance with the teachings of this invention is collapsible, and as such ideally suited for shipping and stacking purposes while being adapted for quick and easy set-up for packaging operation. These features are perhaps best illustrated in the attached drawings wherein the preferred embodiment utilizes six serially connected panels to provide a four compartment carton.

While the foregoing description sets forth the invention in specific terms and in conjunction with a preferred embodiment, it is to be understood that many variations and modifications may be resorted to without departing from the broad aspects of the invention as defined in the appended claims.

Having described the invention, what is claimed is:

1. A collapsible compartmented carton, for separably containing a plurality of articles, formed of a one-piece blank of suitable sheet material such as foldable paperboard, comprising: a pair of spaced parallel vertical side walls; a pair of spaced parallel vertical end walls; one of said end walls comprising a single panel hingedly attached at opposite edges to corresponding edges of respective side walls; the other of said end walls comprising a pair of first and second parallel overlapping end panels hingedly attached to opposite corresponding edges of respective side walls, said first panel extending substantially the distance between said side walls, and being adhesively secured to the outside of the second panel, said second panel having hingedly attached to one edge thereof a vertical single-ply first partition disposed between and extending parallel to the side walls to divide the carton into separate compartments, said partion extending the entire length of the carton and having hingedly attached to its opposite edge a flap adhesively secured to said one end wall, and a second vertical single-ply partition cut from and hingedly attached to a medial portion of said first partition, said second partition extending normal to said first partition on opposite sides thereof and having hingedly attached thereto a pair of flaps adhesively secured to respective side walls; and top and bottom closure flaps hingedly attached to upper and lower horizontal edges of certain of the side walls; the side walls, end walls, and partitions being hinged to each other on parallel hinge lines so that the carton can be collapsed with the partitions secured to the respective end and side walls.

2. A collapsible compartmented carton, for separably containing a plurality of articles, formed of a one-piece blank of suitable sheet material such as foldable paperboard, comprising: a pair of spaced parallel vertical side walls; a pair of spaced parallel vertical end walls; one of said end walls comprising a single panel hingedly attached at opposite edges to corresponding edges of respective side walls; the other of said end walls including a panel having one edge hingedly attached to an opposite edge of one of said side walls and having hingedly attached to another edge thereof a vertical single-ply first partition disposed between and extending parallel to the side walls to divide the carton into separate compartments, said partition extending the entire length of the carton and having hingedly attached to its opposite edge a flap adhesively secured to said one end wall, and a second vertical single-ply partition cut from and hingedly attached to a medial portion of said first partition, said second partition extending normal to said first partition on opposite sides thereof and having hingedly attached thereto a pair of flaps adhesively secured to respective side walls; and top and bottom closure flaps hingedly attached to upper and lower horizontal edges of certain of the walls; the side walls, end walls, and partitions being hinged to each other on parallel vertical hinge lines so that the carton can be collapsed with the partitions secured to the respective end and side walls.

*3. A collapsible compartmented carton, for separably containing a plurality of articles, formed of a one-piece blank of suitable sheet material such as foldable paperboard, comprising: a pair of spaced parallel vertical side walls; a pair of spaced parallel vertical end walls; one of said end walls comprising a single panel hingedly attached at opposite edges to corresponding edges of respective side walls; the other of said end walls including a panel having one edge hingedly attached to an opposite edge of one of said side walls and having hingedly attached to another edge thereof a vertical single-ply first partition disposed between and extending parallel to the side walls to divide the carton into separate compartments, said partition extending the entire length of the carton and having hingedly attached to its opposite edge a flap adhesively secured to said one end wall, and a second vertical single-ply partition cut from and hingedly attached to a medial portion of said first partition, said second partition extending*

*normal to said first partition on opposite sides thereof and having hingedly attached thereto a pair of flaps, at least one of which is adhesively secured to one of said side walls; and top and bottom closure flaps hingedly attached to upper and lower horizontal edges of certain of the walls; the side walls, end walls, and partitions being hinged to each other on parallel vertical hinge lines so that the carton can be collapsed with the partitions secured to the respective end and side walls.*

References Cited in the file of this patent

UNITED STATES PATENTS

| | | |
|---|---|---|
| 1,703,213 | Shugart et al. | Feb. 26, 1929 |
| 2,129,198 | Crouch et al. | Sept. 6, 1938 |
| 2,304,683 | Finn et al. | Dec. 8, 1942 |
| 2,532,446 | Hall | Dec. 5, 1950 |
| 2,747,785 | Fink | May 29, 1956 |
| 2,754,028 | Bergstein | July 10, 1956 |
| 2,778,526 | Forrer | Jan. 22, 1957 |
| 2,804,254 | Ness | Aug. 27, 1957 |